(12) United States Patent
Bahrami et al.

(10) Patent No.: US 10,620,945 B2
(45) Date of Patent: Apr. 14, 2020

(54) API SPECIFICATION GENERATION

(71) Applicant: FUJITSU LIMITED, Kawasaki-shi, Kanagawa (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/851,599

(22) Filed: Dec. 21, 2017

(65) Prior Publication Data
US 2019/0196811 A1 Jun. 27, 2019

(51) Int. Cl.
G06F 8/73 (2018.01)
G06F 8/10 (2018.01)
G06N 20/00 (2019.01)

(52) U.S. Cl.
CPC .......... G06F 8/73 (2013.01); G06F 8/10 (2013.01); G06N 20/00 (2019.01)

(58) Field of Classification Search
CPC ...................................... G06F 8/73; G06F 8/10
See application file for complete search history.

(56) References Cited

U.S. PATENT DOCUMENTS

| | | | | |
|---|---|---|---|---|
| 9,645,999 B1* | 5/2017 | Ciulla | ............... | G06F 17/2785 |
| 9,798,524 B1* | 10/2017 | Colton | ............... | G06F 8/31 |
| 9,823,950 B1* | 11/2017 | Carrier | ............... | G06F 9/543 |
| 2005/0131896 A1* | 6/2005 | Cao | ............... | G06F 17/3061 |
| 2007/0260571 A1* | 11/2007 | Mansfield | ............... | G06F 17/227 706/48 |
| 2011/0313852 A1* | 12/2011 | Kon | ............... | G06F 17/30864 705/14.46 |
| 2013/0173258 A1* | 7/2013 | Liu | ............... | G06F 17/2217 704/9 |
| 2014/0068408 A1* | 3/2014 | Le Chevalier | ............... | G06F 17/2229 715/234 |
| 2017/0102925 A1* | 4/2017 | Ali | ............... | G06F 8/36 |
| 2018/0013579 A1* | 1/2018 | Fairweather | ............... | H04L 67/125 |
| 2018/0315141 A1* | 11/2018 | Hunn | ............... | G06F 17/30011 |

OTHER PUBLICATIONS

U.S. Appl. No. 15/715,658, filed Sep. 26, 2017.
U.S. Appl. No. 15/453,893, filed Mar. 8, 2017.
U.S. Appl. No. 15/374,798, filed Dec. 9, 2016.

* cited by examiner

*Primary Examiner* — Lewis A Bullock, Jr.
*Assistant Examiner* — Mohammad H Kabir
(74) *Attorney, Agent, or Firm* — Maschoff Brennan

(57) ABSTRACT

A method may include obtaining an application programming interface (API) document, such as an API user guide, API reference, or other API documentation, that includes information regarding an API resource, and extracting information from the API document, where the information including at least one function and at least one table that includes an attribute associated with the API resource. The method may also include extracting a description for each of the at least one functions from the API document, and comparing the extracted at least one table to a model of attributes to correlate extracted attributes with extracted functions. The method may additionally include compiling a machine-readable API specification for the API resource described in the API document based on the correlation between extracted attributes and the extracted functions.

20 Claims, 6 Drawing Sheets

API SPECIFICATION GENERATION

FIELD

The embodiments discussed in the present disclosure are related to generation of an application programming interface (API) specification, and in particular, to the transferring of unstructured API attributes to a machine-readable specification.

BACKGROUND

Some software developers have used APIs by which third party computing devices may call a particular functionality at a given location. In response to sending such an API call, a response is provided to the third party computing device or database.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining an application programming interface (API) document that includes information regarding an API resource, and extracting information from the API document, where the information includes at least one function and at least one table that includes an attribute associated with the API resource. The method may also include extracting a description for each of the at least one functions from the API document, and comparing the extracted at least one table to a model of attributes to correlate extracted attributes with extracted functions. The method may additionally include compiling a machine-readable API specification for the API resource described in the API document based on the correlation between extracted attributes and the extracted functions.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
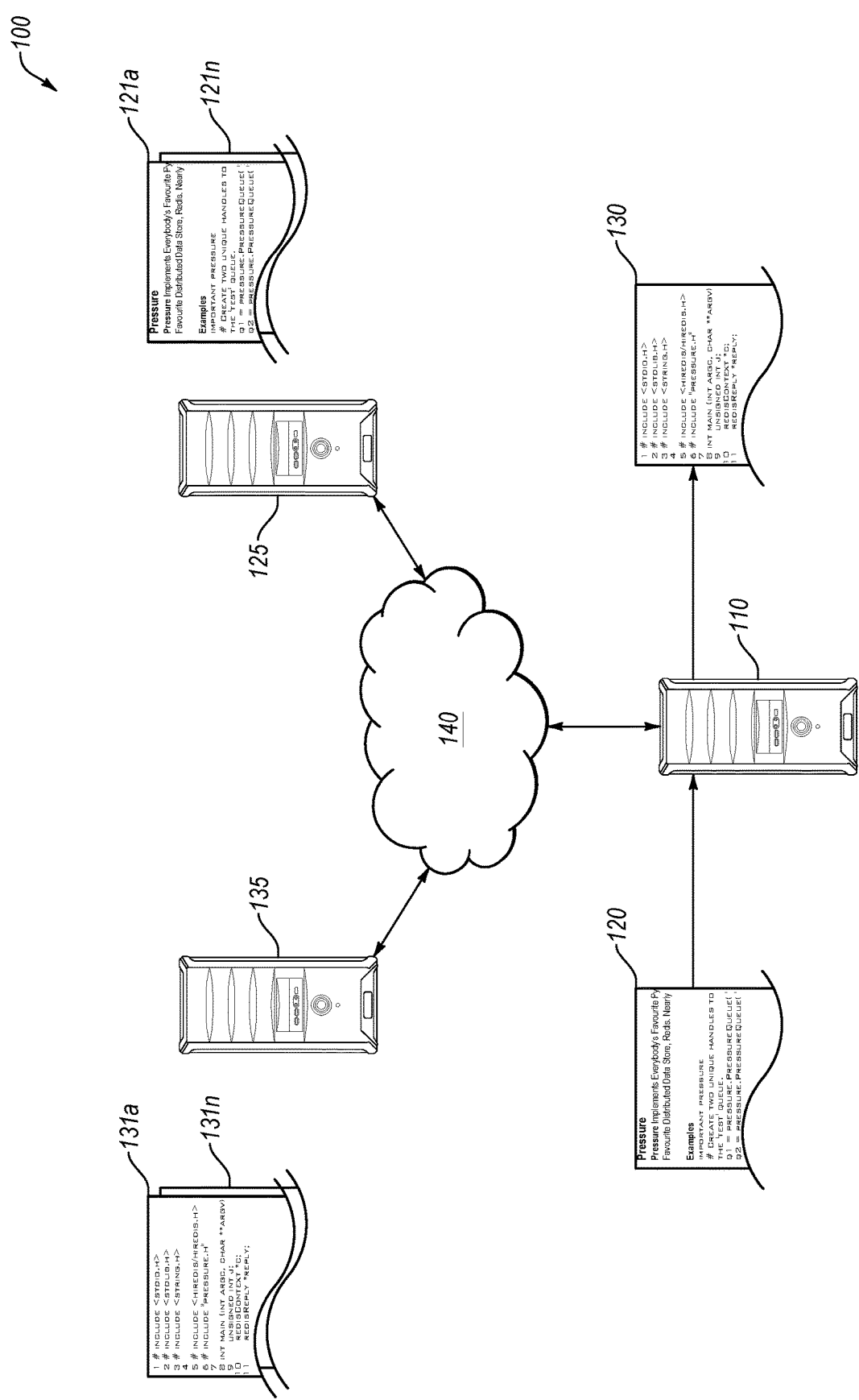
FIG. 1 illustrates an example system related to generating an API specification.

The present disclosure relates to, inter alia, the use of a computing device to analyze an API document to generate an API specification. As used herein, the term API document may refer to documentation, web pages, or other materials that describe an API using plain language, such as a website or other hypertext markup language (HTML) document, a user's guide or reference, an owner's manual, a readme.txt file or a Portable Document Format (PDF) file, or other similar or comparable document that describes an API resource. In some circumstances, an API document may include snippets or other portions of example programming code with explanation regarding the programming code. As used herein, the term API specification may refer to computer-readable instructions for calling and/or implementing an API resource. As used herein, the term API resource may refer to the actual API that is being used, called, implemented, etc. For example, an API document may describe an API resource, and the API specification may include computer-readable code that implements, calls, or otherwise invokes or utilizes the API resource.

In some embodiments, in generating the API specification, a computing device may extract functions and tables of attributes from the API document. The computing device may identify correlations between the extracted functions and the extracted tables of attributes to produce the API specification. In some embodiments, the computing device may train models to facilitate the identification of a type of attribute that the table contains such that the table may be correlated with the API specification in a useful manner. For example, a table may be identified as input parameters for an API resource and may be associated with the API resource as identifying the input parameters for that particular API resource such that the computer-readable code of the API specification may include the correct information regarding the API resource.

The generation of an API specification from an API document may provide a number of benefits to the operation of a computer itself, and improvements to the related field of computer programming. With respect to the computer itself, the generation of the API specification may provide the computer with improved functionality by allowing the computer to invoke and/or implement the API resource described in the API document. Furthermore, the present disclosure may permit a computing device to perform tasks not previously performable by computers. For example, the present disclosure may facilitate the correlation of attributes to functions from a plain language document describing an API resource such that computer-readable instructions for the API resource may be generated. Thus, embodiments of the present disclosure may improve the performance of a computer itself.

With respect to improving computer programming, the present disclosure may provide enhanced capabilities and generation of computer-readable code. For example, the present disclosure may facilitate the generation of computer-readable code from a plain language document. Thus, embodiments of the present disclosure may improve the computer programming.

Embodiments of the present disclosure are explained with reference to the accompanying drawings.

FIG. 1 illustrates an example system 100 related to generating an API specification, in accordance with one or more embodiments of the present disclosure. The system 100 may include a computing device 110 configured to obtain an API document 120, perform analysis or processing on the API document 120, and produce an API specification 130 for the API resource of the API document 120. In some embodiments, the system 100 may include a first server 125 that may host one or more API documents, such as the API documents 121a-121n. In some embodiments, the system 100 may include a second server 135 that may host one or more API specifications, such as the API specifications 131a-131n. In some embodiments, the API specifications 131a-131n may correspond to the API documents 121a-121n, such that the API document 121a may describe an API resource of the API specification 131a. In these and other embodiments, the first server 120 and the second server 130 may be the same computing device, different computing devices, or any combination thereof, storing any combination of API documents and/or API specifications.

In some embodiments, the computing device 110 may be configured to obtain the API document 120. The API document 120 may be obtained by downloading a copy of the API document 120 to the computing device 110, scanning a physical copy of the API document 120, etc. The API document 120 may include a description of how a given API resource described in the API document works, what functionality the given API resource provides, the purposes of the given API resource (e.g., goals, inputs, outputs, etc.), how a software application may interact with the given API resource, examples in different programming languages of how to interact with the given API resource, descriptions of API parameters (e.g., inputs) and responses (e.g., outputs), etc. In some embodiments, the API document 120 may include plain text sentences and/or tables of information.

After obtaining the API document 120, the computing device 110 may extract information from the API document 120. For example, the computing device 110 may perform a process such as that described in U.S. application Ser. No. 15/374,798 ("API LEARNING"), which is incorporated herein by reference in its entirety, to extract information from the API document 120, although any such information extraction process may be followed. The output of such an extraction process may include one or more functions, a description of each of the one or more functions (for example, as described as being extracted in FIG. 3), and/or one or more tables that include attributes.

In some embodiments, the extracted functions may include a network endpoint at which the function may be called, such as a uniform resource locator (URL) or uniform resource identifier (URI) of the network endpoint. Additionally or alternatively, the extracted function may include a Hypertext Transfer Protocol (HTTP) function such as PUSH, POST, DELETE, PUT, etc. associated with accessing the URL or URI of the extracted function. In these and other embodiments, the combination of such an HTTP function with a URL or URI may facilitate the identification of a function within the API document 120.

The tables extracted from the API document 120 may include one or more attributes associated with the given API resource of the API document 120. In some embodiments, an extracted table may be associated with a given type. For example, the table may include input parameters of the given API resource, input data for the given API resource, output data for the given API resource, output result (e.g., the format of the output) for the given API resource, error codes of the given API resource, or any other attributes associated with the given API resource. In some embodiments, one or more of the extracted tables may provide information regarding one or more types of tables. For example, an extracted table may provide information regarding the input parameters, such as whether they are required, character limits, etc.

In some embodiments, the computing device 110 may extract a description of the extracted functions. In these and other embodiments, the computing device 110 may locate a given function within the API document 120 and may extract various portions of language from within the API document 120 around the given function. For example, the header above the given function may be extracted, and a certain number of sentences before and/or after the given function may be extracted. In these and other embodiments, some of the extracted text may be removed from the description, for example, by removing short sentences (e.g., less than five words) or removing incomplete sentences to yield the description of the given function. An example method of extracting a description of a function may be described in greater detail with respect to FIG. 3.

In some embodiments, the computing device 110 may develop and/or otherwise train one or more machine learning models to facilitate the generation of the API specification 130. In these and other embodiments, the computing device 110 may obtain one or more of the API specifications 131a-131n and may use such API specifications to train the machine learning models. In these and other embodiments, a different model may be trained for different types of tables. For example, one model may be trained for identifying parameter inputs for an API resource, and another model may be trained for identifying response types of the API resource, etc.

To train a given model, a set of known API specifications (e.g., the API specifications 131a-131n stored by the second server 135) may be obtained by the computing device 110 and the API specifications 131a-131n may be converted from a tree structure or other machine-readable notation into a string of characters for analysis. The computing device 110 may combine all of the strings of characters into a positive corpus of all the terms for all the strings of characters. The computing device 110 may remove some words from the positive corpus, such as stop words (e.g., a, an, the, it, etc.). The computing device 110 may count a number of times that the remaining words appear in the positive corpus, and if occurring frequently enough (e.g., above a threshold amount), add the term to a weight corpus. The weight corpus may be associated with a given type such that if a given term in a weight corpus occurs a certain number of times, the likelihood is raised that a data structure being analyzed is of the type associated with the weight corpus. In some embodiments, a table may be analyzed using the model to determine an association with a given function (e.g., the table may include input parameters for the function). Additionally or alternatively, a table may be analyzed using the model to determine an association with another table (e.g., the table may include formatting parameters of the input parameters).

In some embodiments, the weight corpus may be verified by applying the model that uses the weight corpus to a test API document, such as the API documents 121a-121n. The API documents 121a-121n may include tables of a known type such that applying the model that uses the weight corpus to the known API document may yield a result that may be compared to the known result to verify the accuracy of the model. In some embodiments, if there is a mismatch between the result of applying the model and the known result, additional API specifications may be utilized to make the model more robust. Additionally or alternatively, the weight corpus may be analyzed to determine whether certain terms are to be excluded. An example of training and/or verifying a model may be explained in greater detail with reference to FIG. 4.

In some embodiments, the computing device 110 may use the models to determine a type for each of the tables extracted from the API document 120 in a similar manner to verifying the models. For examples, the tree structure or other machine-readable notation of a given table may be converted into a string of terms and the terms may be counted and compared to the weight corpus of the model to determine whether or not the number of terms appearing in the table that also appear in the weight corpus occur a number of times above a threshold. If so, the computing device 110 may determine that the table is of a type that is the same as the type of the weight corpus of the model.

In some embodiments, the computing device 110 may identify correlations between the tables and the functions extracted from the API document 120. For example, the computing device 110 may identify tables that are within the same heading in the API document 120 as a given function. Those tables may be assigned to the given function based on the type as identified using the trained models and based on the tables being located within the same heading in the API document 120 as the given function.

After identifying correlations between tables and endpoints, the computing device 110 may combine various information into a computer-readable notations as the API specification 130, such as an extensible markup language (XML) file, JavaScript Object Notation (JSON) file, etc. For example, the computing device may include the function extracted from the API document 120 with the associated input parameters, output parameters, etc. as identified in the tables extracted from the API document 120. In these and other embodiments, the API specification 130 may include the description of the function extracted from the API document 120. The API specification 130 may include a computer-readable notation to implement the API resource of the API document 120.

In some embodiments, the computing device 110 may obtain the API documents 120 and/or 121a-121n, and/or the API specifications 131a-131n by communicating over the network 140. Additionally or alternatively, the computing device 140 may provide the API specification 130 to another computing device while communicating over the network 140.

The network 140 may be implemented as a conventional type network, a wired or wireless network, and/or may have any of numerous different configurations or combinations thereof. Furthermore, the network 140 may include a local area network (LAN), a wide area network (WAN) (e.g., the Internet), or other interconnected data paths across which multiple devices and/or entities may communicate. In some embodiments, the network 140 may include a peer-to-peer network. The network 140 may also be coupled to or may include portions of a telecommunications network for sending data in a variety of different communication protocols. In some embodiments, the network 140 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The network 140 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

Modifications, additions, or omissions may be made to the system 100 without departing from the scope of the present disclosure. For example, the system 100 may include any number of API documents and/or API specifications from any number of computing devices.

For each of the methods illustrated in FIGS. 2-5, the methods may be performed by any suitable system, apparatus, or device. For example, the computing device 110 of FIG. 1, or other systems or devices may perform one or more of the operations associated with the methods. Although illustrated with discrete blocks, the steps and operations associated with one or more of the blocks of the methods may be divided into additional blocks, combined into fewer blocks, or eliminated, depending on the desired implementation.

Additionally, for each of the methods illustrated in FIGS. 2-5, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 2:
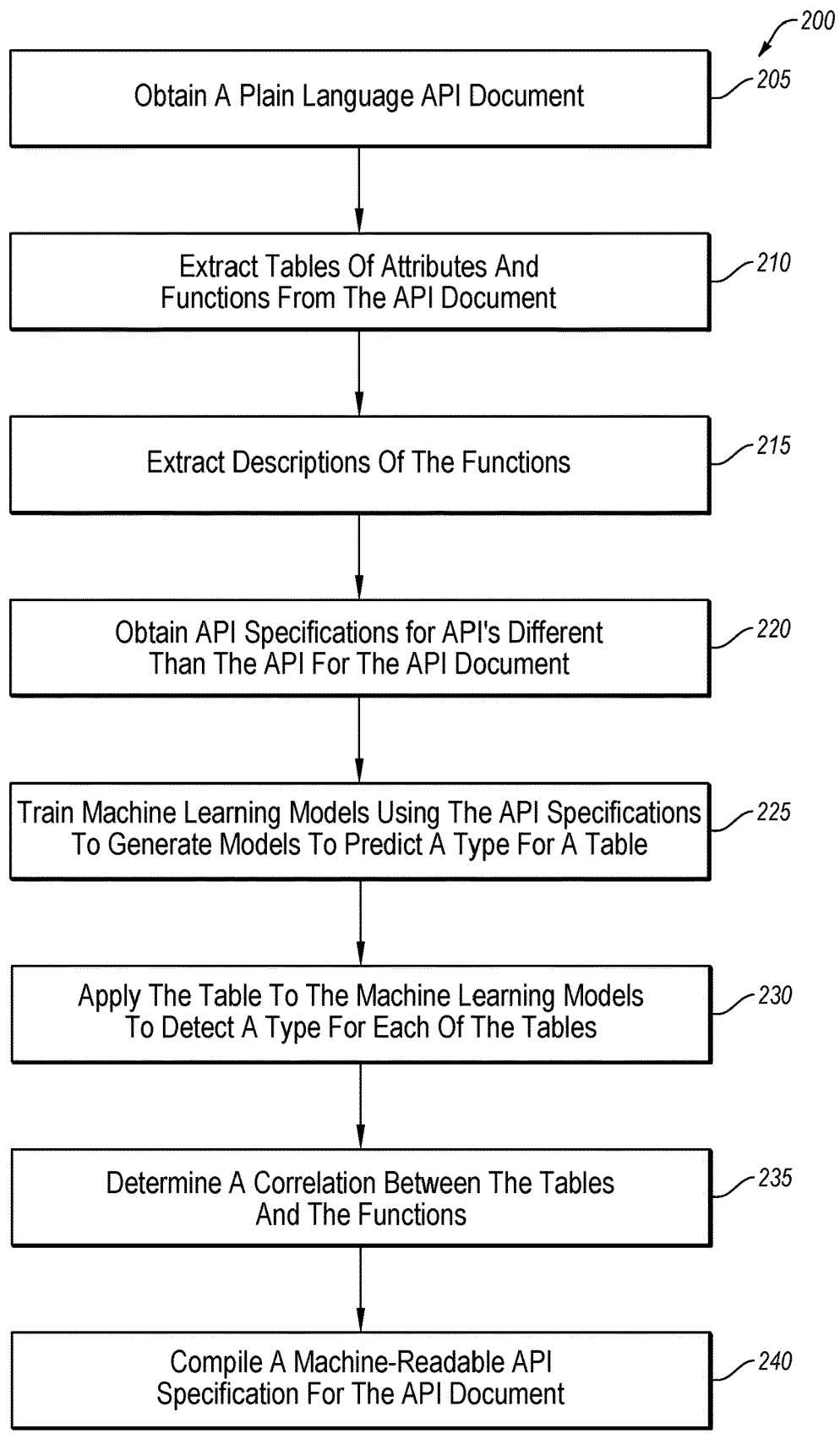
FIG. 2 illustrates a flowchart of an example method of generating an API specification.

FIG. 2 illustrates a flowchart of an example method 200 of generating an API specification, in accordance with one or more embodiments of the present disclosure.

At block 205, a plain language API document may be obtained. For example, a computing device (such as the computing device 110 of FIG. 1) may download, scan, or otherwise obtain a copy of the plain language API document. The API document may explain, using plain language, the capabilities, functionality, inputs, outputs, etc. of the API resource described in the API document.

At block 210, information may be extracted from the API document, including tables of attributes and functions. For example, the computing device may identify and extract tables that include attributes related to one or more functions described in the API document and/or the functions in the document. In these and other embodiments, the computing device may use any content extraction technique to obtain the tables and/or the functions.

At block 215, descriptions of the extracted functions may be extracted from the API document. The description for each of the extracted functions may include plain text proximate the function in the API document. For example, the computing device may locate the function in the API document and may extract language before and after the function in the API document. An example of extracting a description of a function may be described in greater detail with respect to FIG. 3.

At block 220, one or more API specifications for API resources other than the API resource described in the API document obtained at block 205 may be obtained. For example, one or more servers hosting software projects and/or API resources may be queried to build a database or other repository of known API specifications to be used in generating and/or training models to be used in the generation of the API specification for the API document.

At block 225, machine learning models may be trained using the API specifications of the block 220 to generate models to predict a type for a table. For example, the computing device may generate a weight corpus for a given type of table indicative of terms that frequently show up in a table of the given type. In some embodiments, a model may be generated for each of multiple potential types of tables, such as one model for input parameters, one model for input data types, one model for output data types, one model for output results, one model for data types, one model for error codes, etc. An example of generating and/or training such a model may be described in greater detail with respect to FIG. 4.

At block 230, one or more of the extracted tables may be applied to the models of the block 225 to detect a type for each of the extracted tables. For example, the terms that appear in a given table may be counted to determine a number of times that they appear in the given table, and the terms may be compared to the terms in a weight corpus of a model. Based on the terms in the weight corpus appearing in the given table more than a threshold number of times, the given table may be found to correspond to the type associated with the weight corpus of the model. In some embodiments, whether or not a given table is detected as being of the type associated with a given model may be based on an average score of terms in the weight corpus appearing in the table, and a first threshold number of terms appearing over a second threshold number of times, or a priority listing of terms in the weight corpus with a weighted score for the table depending on how many times the higher priority terms appear in the table, etc. In these and other embodiments, by generating a set of numbers of repetition of each term, a model may be generated that may be configured to predict the likelihood of assigning a set of terms to a table type.

At block 235, correlations between the extracted tables of attributes and the extracted functions may be determined. For example, the API document may be analyzed by the computing device to locate the function within the API document and the next header above the function may be identified. Any of the extracted tables within the same header as the function may be identified. If a single table is in the same header, that table may be assigned to the function. If multiple tables are present, the type may be determined (for example, via the application of the models as described in the block 225). After determining the type, the tables, with their identified type, may be assigned to the given function. The blocks 230 and/or 235 may be described in greater detail with respect to FIG. 5.

At block 240, a machine-readable API specification may be compiled for the API document. For example, the computing device may compile the function extracted from the API document, the description of the function, and the tables with their corresponding types in a single computer-readable file, such as a Java-Script Object Notation (JSON) file. The API specification may be usable by a computing device to implement and/or generate calls to the API resource. Additionally or alternatively, the API specification may include information regarding inputs, output, data format, etc. of the API resource of the API document.

Figure 3:
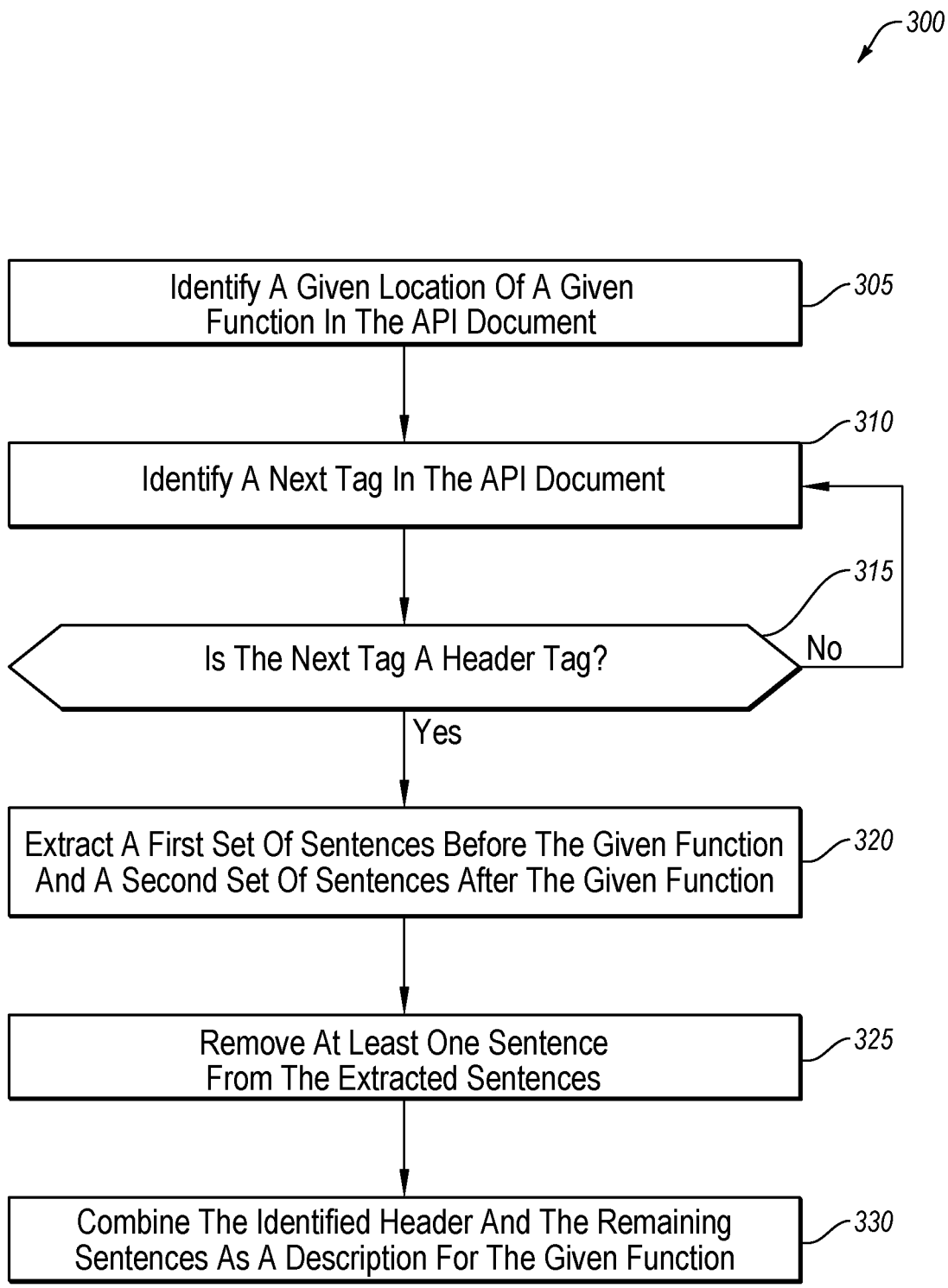
FIG. 3 illustrates a flowchart of an example method of extracting descriptions of one or more functions.

FIG. 3 illustrates a flowchart of an example method 300 of extracting descriptions of one or more functions, in accordance with one or more embodiments of the present disclosure. In some embodiments, the method 300 may provide an example and/or greater detail of the block 215 of FIG. 2.

At block 305, a location of a given function may be identified in the API document. For example, the location within the API document (such as the API document 120 of FIG. 1) of code associated with the given function may be determined by a computing device (such as the computing device 110 of FIG. 1).

At block 310, a next tag in the API document may be identified. For example, starting at the location of the given function in the API document, a next tag moving upward in the API document may be identified. In these and other embodiments, the next tag may include a tag identifying a field of text in an HTML document (e.g., a <Head> tag, an <html> tag, or a <p> tag, etc.), an Extensible Markup Language (XML) document, an Extensible HTML (XHTML) document, etc. Additionally or alternatively, the tag may include a formatting change (e.g., bolding, underling, text size variance, etc.) in a portable document format (PDF) or other document.

At block 315, a determination may be made as to whether the next tag identified in the block 310 is a header tag. For example, a header tag may include a designated header tag (e.g., a <head> tag for an HTML document), or a root tag (e.g., an <html> tag for an HTML document). If the next tag is a header tag, the method 300 may proceed to the block 320. If the next tag is not a header tag, the method 300 may return to the block 310 to identify the next tag moving upward to the next tag in the API document.

At block 320, a first set of sentences before the location of the given function and a second set of sentences after the given function may be extracted. For example, the computing device may extract a first number (e.g., two, three, four, five, ten, etc.) of sentences before the location of the given function and a second number (e.g., two, three, four, five, ten, etc.) of sentences after the location of the given function.

At block 325, one or more of the extracted sentences may be removed. For example, the computing device may determine whether or not any of the extracted sentences are unrelated to the disclosure. Such sentences may include a sentence with a number of words below a threshold (e.g., the block 325 may remove any sentences with two, three, four, or five words, etc.), incomplete sentences (e.g., sentences without a verb, sentences without a starting capital letter, etc.). If there are no incomplete sentences or short sentences, in some embodiments the block 325 may be skipped and none of the extracted sentences may be removed.

At block 330, a description for the given function may be generated by combining the header of the identified header tag and the remaining extracted sentences. For example, the first set and second set of sentences (less any sentences removed in the block 325) may be combined with the textual description of the header to derive the description of the given function.

Figure 4:
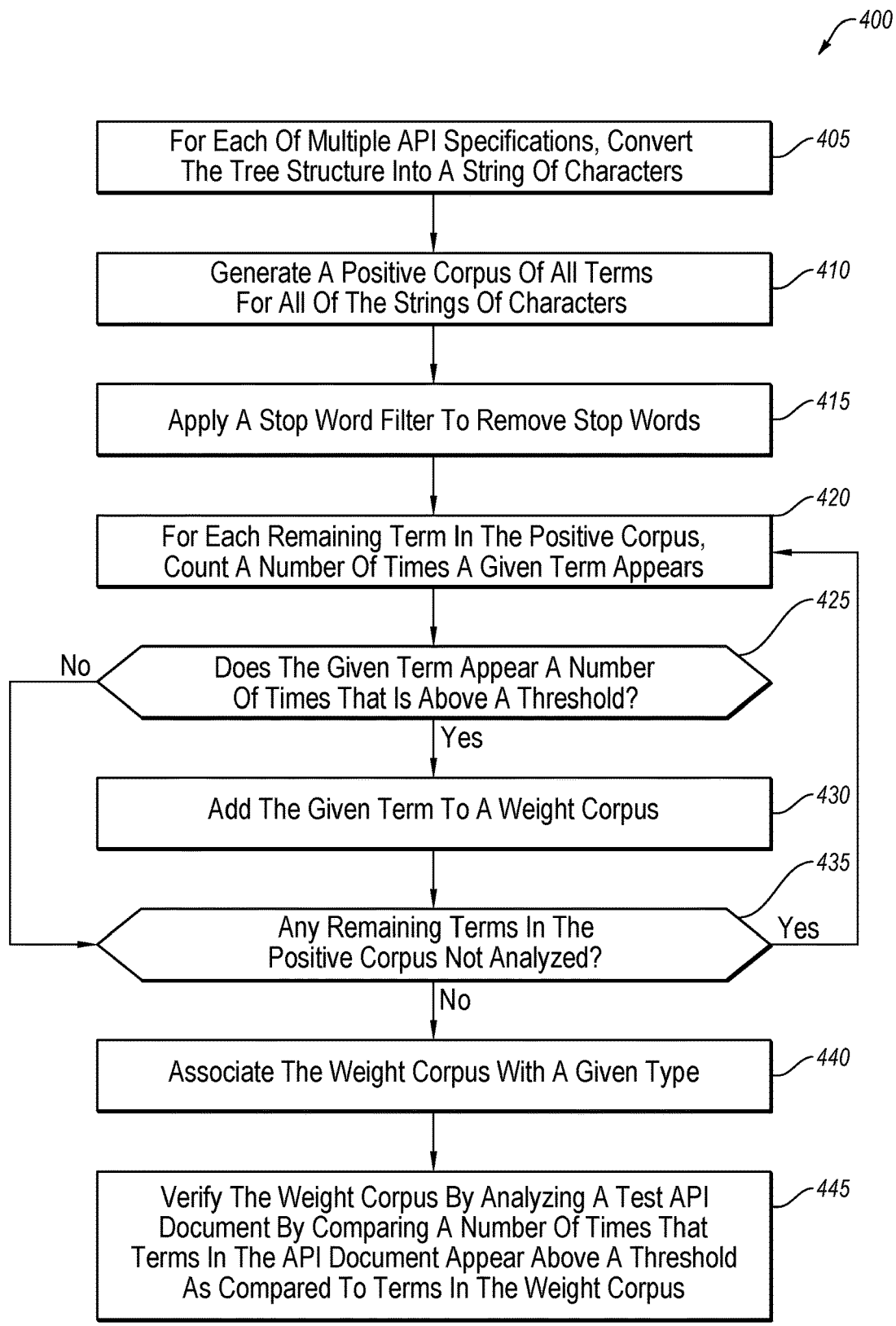
FIG. 4 illustrates a flowchart of an example method of training a machine learning model.

FIG. 4 illustrates a flowchart of an example method 400 of training a machine learning model, in accordance with one or more embodiments of the present disclosure. In some embodiments, the method 400 may provide an example and/or greater detail of the block 225 of FIG. 2.

At block 405, for each of multiple API specifications, a tree structure or other machine-readable notation of the API specification may be converted to a string of characters. For example, a computing device (such as the computing device 110 of FIG. 1) may obtain multiple known API specifications (such as the API specifications 131*a*-131*n* of FIG. 1). The computing device may take the tree structure (e.g., a set of nested components at varying levels with information stored in the different levels such as a JSON file) of the known API specifications and convert each of them into a string of terms. For example, if the tree structure included a heading "Input Parameters" and below the heading in the tree structure the terms "alpha-numerical character" and "Boolean," the string of characters may include {Input, Parameters, Alpha-numerical, characters, Boolean}. In some embodiments, sets of keys and values may be handled together or may be treated as strings separately (e.g., a string of keys and string of values). The block 405 may be repeated for each of multiple API specifications.

At block 410, a positive corpus may be generated of all terms for all of the strings of characters. For example, each term that appears in the strings of characters may be combined into a set of terms that represent all terms in all of the known API specifications.

At block 415, a stop word filter may be applied to the positive corpus of the block 410. For example, words such as "is" and "the" may be removed from the positive corpus.

At block 420, for each remaining term in the positive corpus, a count may be taken of the number of times that the term appears in the API specifications. For example, if the term "request" is in the positive corpus, a determination may be made of how many times the term "request" occurs in all sentences of all of the known API specifications.

At block 425, a determination may be made of whether the given term appears a number of times that is above a threshold. Following the example above, if the threshold of 100 is used, a determination may be made whether the term "request" appears more than 100 times across all of the known API specifications. If the given terms appears a number of times above the threshold, the method 400 may proceed to the block 430. If the term does not, the method 400 may proceed to the block 435.

At block 430, the given term that appeared more times than the threshold value may be added to a weight corpus. The weight corpus may represent the terms from the API specifications that appeared frequently enough to carry weight on indicating whether an unknown specification or document may be related to the same terms as the model being constructed.

At block 435, a determination may be made whether there are any terms remaining in the positive corpus not analyzed. If there are terms remaining that have not been counted and potentially added to the weight corpus, the method 400 may return to the block 420 to analyze the next term in the positive corpus. If all terms have been analyzed, the method 400 may proceed to the block 440.

At block 440, the weight corpus may be associated with a given type for a table. For example, the weight corpus may be associated with any of input data types, output data types, output results, data types, error codes, etc. In some embodiments, rather than the entire weight corpus being associated with one type, certain terms of a weight corpus may be associated with one type, and other terms of the weight corpus may be associated with another type. In these and other embodiments, two different models may use the same terms with different thresholds for different types.

Figure 5:
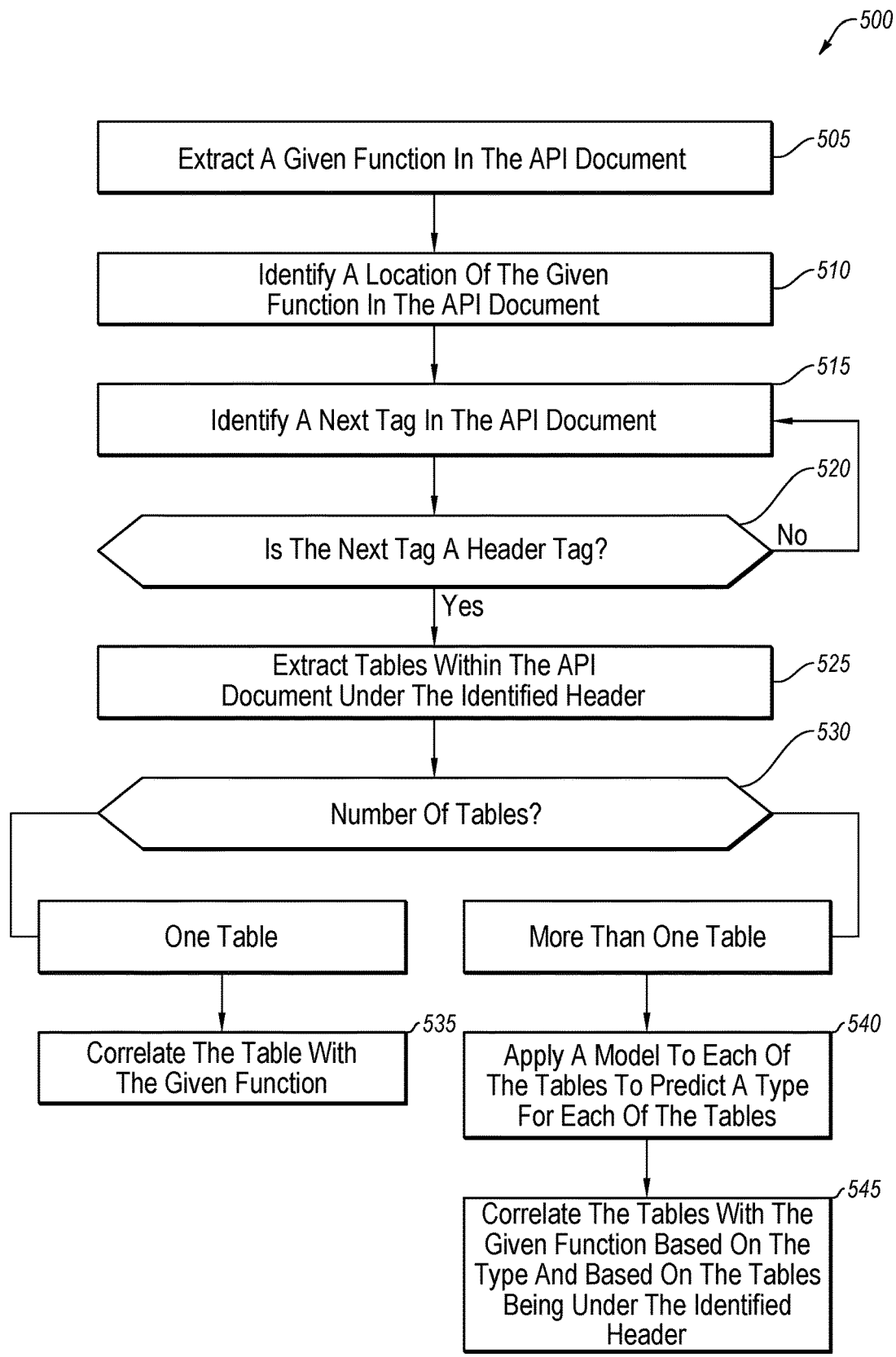
FIG. 5 illustrates a flowchart of an example method of determining a correlation between a table and a function.

At block 445, the weight corpus and/or the models of the block 440 may be verified using test API documents. For example, a given test API document with tables of a known type may be analyzed and/or compared to the weight corpus to determine the type of the table. In these and other embodiments, such an analysis may be performed by counting the number of times that terms appear in the API specification (or in a table of the API specification) and comparing the number of times to a threshold associated with the terms in the weight corpus. For a given model, if the number of times for a threshold number of terms exceeds a threshold, the analyzed table may be of the type of the given model. The analysis may be similar or comparable to that performed at block 230 of FIG. 2. If the test API type matches the type suggested by the model, FIG. 5 illustrates a flowchart of an example method 500 of determining a correlation between a table and a function, in accordance with one or more embodiments of the present disclosure. In some embodiments, the method 500 of FIG. 5 may provide an example of or additional detail to the blocks 230 and/or 235 of FIG. 2.

At block 505, a given function may be extracted from the API document. For example, a computing device (such as the computing device 110 of FIG. 1) may extract a given function from the API document. The block 505 may be similar or comparable to the block 210 of FIG. 2

At block 510, a location of the given function in the API document may be identified. For example, the computing device may identify a portion of the API document with code associated with the extracted function. The block 510 may be similar or comparable to the block 305 of FIG. 3.

At block 515, a next tag in the API document may be identified. The block 515 may be similar or comparable to the block 310 of FIG. 3.

At block 520, a determination may be made whether the next tag is a header tag. The block 520 may be similar or comparable to the block 315 of FIG. 3. If the next tag is a header tag, the method 500 may proceed to the block 525. If the next tag is not a header tag (or the root tag) the method 500 may return to the block 515 to move up to the next header in the API document.

At block 525, all tables within the API document under the identified header may be extracted. For example, based on the tables being within the same heading in the API document as the given function, one or more tables may be extracted. In these and other embodiments, the tables within the same heading as the function may be presumed to be associated with the given function or an endpoint. In some embodiments, when determining a correlation between a function and one or more tables (e.g., the block 235 of FIG. 2), the correlations may be limited to tables within the same heading in the API document as the given function.

At block 530, a determination may be made of the number of tables within the same heading as the given function. If there is a single table, the method 500 may proceed to the block 535. If there is more than one table, the method 500 may proceed to the block 540.

At block 540, the extracted table may be correlated to the given function.

At block 545, a model may be applied to each of the tables to predict a type for each of the tables. The block 545 may be similar or comparable to the block 230 of FIG. 2. For example, for a given table, the terms in the table may be removed from the tree structure of the table and placed in a string such that the number of times that the terms appear may be compared to a weight corpus associated with a model of a given type. If a number of terms appear a threshold of number of times, the table may be identified as associated with the type of that model.

At block 545, the tables with identified types may be correlated to the given function based on the type and based on the tables being under the identified header. For example, a first table under the heading of the given function may be identified at the block 540 as including input parameters, and a second table under the heading of the given function may be identified at the block 540 as including output results. In such an embodiment, both tables may be correlated with the given function in a manner that correlates them to the function based on their type.

Figure 6:
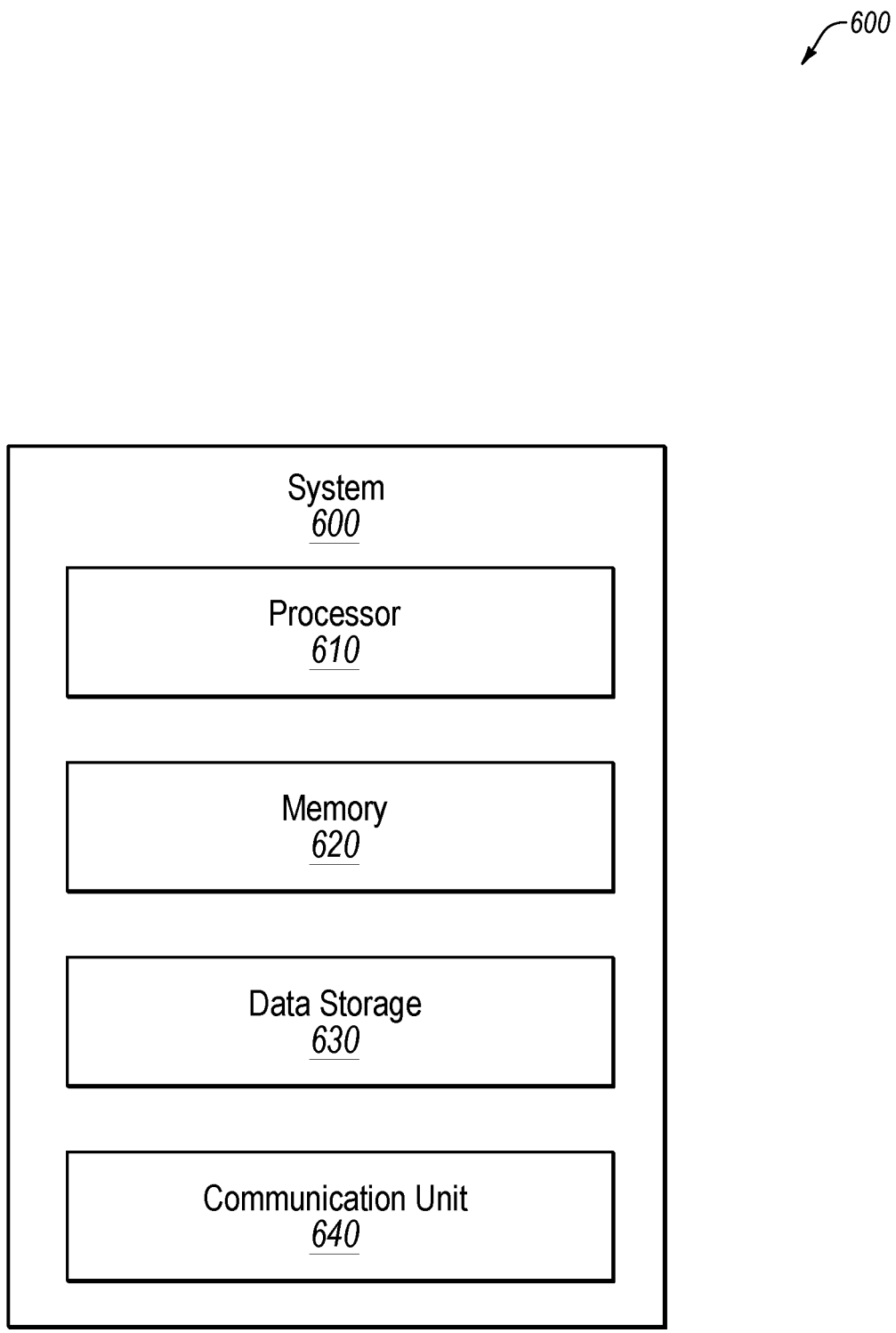
FIG. 6 illustrates an example computing system.

FIG. 6 illustrates an example computing system 600, according to at least one embodiment described in the present disclosure. The system 600 may include any suitable system, apparatus, or device configured to communicate over a network. The computing system 600 may include a processor 610, a memory 620, a data storage 630, and a communication unit 640, which all may be communicatively coupled. The data storage 630 may include various types of data, such as API documents, API specifications, etc.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform the methods 200, 300, 400, or 500, of FIGS. 2, 3, 4, and 5, respectively. For example, the processor 610 may obtain instructions regarding extracting information from an API document, correlating tables from the information to functions in the information, and compiling a machine-readable API specification for the API document.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

Modifications, additions, or omissions may be made to the system 600 without departing from the scope of the present disclosure. For example, the data storage 630 may be multiple different storage mediums located in multiple locations and accessed by the processor 610 through a network.

As indicated above, the embodiments described in the present disclosure may include the use of a special purpose or general purpose computer (e.g., the processor 610 of FIG. 6) including various computer hardware or software modules, as discussed in greater detail below. Further, as indicated above, embodiments described in the present disclosure may be implemented using computer-readable media (e.g., the memory 620 or data storage 630 of FIG. 6) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    obtaining an application programming interface (API) document associated with an API resource, the API document including a function and a corresponding header beneath which the function is described using plain-language sentences;
    extracting information from the API document, the information including the function and at least one table that includes an attribute associated with the API resource;
    extracting, from the API document, a description for the function from the API document, comprising:
        identifying, within the API document, the function at a location within the API document;
        identifying a header tag of the header beneath which the function is located;
        extracting a first set of plain-language sentences between the function and the identified header in the API document, the plain-language sentences in the API document that describe the function including the first set of plain-language sentences; and
        combining the identified header and the first set of sentences as the description;
    comparing the at least one table to a model of attributes to correlate the attribute with the extracted function, the at least one table selected based on the at least one table being located beneath the header within the API document; and
    compiling a machine-readable API specification for the API resource described in the API document based on the correlation between the attribute and the extracted function, the machine-readable API specification including the description that includes the header and the first set of sentences.

2. The method of claim 1, wherein the at least one table is one of a plurality of types including input parameters, input data types, output data types, output results, data types, and error codes.

3. The method of claim 2, wherein the model of attributes is specific to a type of the table.

4. The method of claim 1, wherein extracting the description for the function further includes:
    extracting a second set of sentences after the function in the API document;
    removing at least one sentence from the second set of sentences; and
    wherein combining the header and the first set of sentences further comprises combining the second set of sentences with the header and the first set of sentences without the removed at least one sentence to form the description.

5. The method of claim 1, further comprising:
    obtaining a plurality of machine readable API specifications for API resources different from the API resource;
    training machine learning models using the plurality of machine readable API specifications to generate models that predict whether, for a given table, the table is of a type associated with a given model; and
    applying the at least one table to the machine learning models to detect a type for each of the at least one tables.

6. The method of claim 5, wherein training the machine learning models includes:
- for each of the plurality of machine readable API specifications, converting a tree structure or a machine-readable notation of a respective API specification into a string of characters;
- generating a positive corpus of all terms in a combination of all of the string of characters;
- applying a stop word filter to remove stop words from the positive corpus;
- for each remaining term, counting a number of times a given term appears;
- adding the given term to a weight corpus based on the given term appearing more times than a threshold amount;
- associating the weight corpus with a given type; and
- verifying the weight corpus by analyzing a number of times a term appears in a test API document and comparing terms with the number of times above a threshold with the terms in the weight corpus.

7. The method of claim 1, further comprising:
- extracting multiple tables within the API document under the identified header tag;
- based on a number of the multiple extracted tables exceeding one, applying a model to the multiple extracted tables to predict a type for each of the extracted tables; and
- applying the tables to the function based on the type and based on the multiple extracted tables being under the identified header tag.

8. One or more non-transitory computer-readable media containing instructions, which, when executed by one or more processors, cause a system to perform operations, the operations comprising:
- obtaining an application programming interface (API) document associated with an API resource, the API document including a function and a corresponding header beneath which the function is described using plain-language sentences;
- extracting information from the API document, the information including the function and at least one table that includes an attribute associated with the API resource;
- extracting, from the API document, a description for the function from the API document, comprising:
  - identifying, within the API document, the function at a location within the API document;
  - identifying a header tag of the header beneath which the function is located;
  - extracting a first set of plain-language sentences between the function and the identified header in the API document, the plain-language sentences in the API document that describe the function including the first set of plain-language sentences; and
  - combining the identified header and the first set of sentences as the description;
- comparing the at least one table to a model of attributes to correlate the attribute with the extracted function, the at least one table selected based on the at least one table being located beneath the header within the API document; and
- compiling a machine-readable API specification for the API resource described in the API document based on the correlation between the attribute and the extracted function, the machine-readable API specification including the description that includes the header and the first set of sentences.

9. The computer-readable media of claim 8, wherein the at least one table is one of a plurality of types including input parameters, input data types, output data types, output results, data types, and error codes.

10. The computer-readable media of claim 9, wherein the model of attributes is specific to a type of the table.

11. The computer-readable media of claim 8, wherein extracting the description for the function further includes:
- extracting a second set of sentences after a given function in the API document;
- removing at least one sentence from the second set of sentences; and
- wherein combining the header of the identified header tag and the first set of sentences further comprises combining the second set of sentences with the header and the first set of sentences without the removed at least one sentence to form the description.

12. The computer-readable media of claim 8, wherein the operations further comprise:
- obtaining a plurality of machine readable API specifications for API resources different from the API resource;
- training machine learning models using the plurality of machine readable API specifications to generate models that predict whether, for a given table, the table is of a type associated with a given model; and
- applying the at least one table to the machine learning models to detect a type for each of the at least one tables.

13. The computer-readable media of claim 12, wherein training the machine learning models includes:
- for each of the plurality of machine readable API specifications, converting a tree structure or a machine-readable notation of a respective API specification into a string of characters;
- generating a positive corpus of all terms in a combination of all of the string of characters;
- applying a stop word filter to remove stop words from the positive corpus;
- for each remaining term, counting a number of times a given term appears;
- adding the given term to a weight corpus based on the given term appearing more times than a threshold amount;
- associating the weight corpus with a given type; and
- verifying the weight corpus by analyzing a number of times a term appears in a test API document and comparing terms with the number of times above a threshold with the terms in the weight corpus.

14. The computer-readable media of claim 8, further comprising:
- extracting multiple tables within the API document under the identified header tag;
- based on a number of the multiple extracted tables exceeding one, applying a model to the multiple extracted tables to predict a type for each of the extracted tables; and
- applying the tables to the function based on the type and based on the multiple extracted tables being under the identified header tag.

15. A system comprising:
- one or more processors; and
- one or more non-transitory computer-readable media containing instructions, which, when executed by the one or more processors, cause the system to perform operations, the operations comprising:
  - obtaining an application programming interface (API) document associated with an API resource, the API document including a function and a corresponding header beneath which the function is described using plain-language sentences;

extracting information from the API document, the information including the function and at least one table that includes an attribute associated with the API resource;

extracting, from the API document, a description for the function from the API document, comprising:
identifying, within the API document, the function at a location within the API document;
identifying a header tag of the header beneath which the function is located;
extracting a first set of plain-language sentences between the function and the identified header in the API document, the plain-language sentences in the API document that describe the function including the first set of plain-language sentences; and
combining the identified header and the first set of sentences as the description;

comparing the at least one table to a model of attributes to correlate the extracted attribute with the extracted function, the at least one table selected based on the at least one table being located beneath the header within the API document; and compiling a machine-readable API specification for the API resource described in the API document based on the correlation between the attribute and the extracted function, the machine-readable API specification including the description that includes the header and the first set of sentences.

16. The system of claim 15, wherein:
the at least one table is one of a plurality of types including input parameters, input data types, output data types, output results, data types, and error codes; and
the model of attributes is specific to the type of the table.

17. The system of claim 15, wherein extracting the description for the function further includes:
extracting a second set of sentences after the function in the API document;
removing at least one sentence from the second set of sentences; and
wherein combining the header and the first set of sentences further comprises combining the second set of sentences with the header and the first set of sentences without the removed at least one sentence to form the description.

18. The system of claim 15, wherein the operations further comprise:
obtaining a plurality of machine readable API specifications for API resources different from the API resource;
training machine learning models using the plurality of machine readable API specifications to generate models that predict whether, for a given table, the table is of a type associated with a given model; and
applying the at least one table to the machine learning models to detect a type for each of the at least one tables.

19. The system of claim 18, wherein training the machine learning models includes:
for each of the plurality of machine readable API specifications, converting a tree structure or a machine-readable notation of a respective API specification into a string of characters;
generating a positive corpus of all terms in a combination of all of the string of characters;
applying a stop word filter to remove stop words from the positive corpus;
for each remaining term, counting a number of times a given term appears;
adding the given term to a weight corpus based on the given term appearing more times than a threshold amount;
associating the weight corpus with a given type; and
verifying the weight corpus by analyzing a number of times a term appears in a test API document and comparing terms with the number of times above a threshold with the terms in the weight corpus.

20. The system of claim 15, further comprising:
extracting multiple tables within the API document under the identified header tag;
based on a number of the multiple extracted tables exceeding one, applying a model to the multiple extracted tables to predict a type for each of the extracted tables; and
applying the tables to the function based on the type and based on the multiple extracted tables being under the identified header tag.

* * * * *